United States Patent
Chung

(10) Patent No.: US 9,831,661 B2
(45) Date of Patent: Nov. 28, 2017

(54) USER EQUIPMENT AND OPERATING METHOD THEREOF

(71) Applicant: Samsung Electronics Co., Ltd., Gyeonggi-do (KR)

(72) Inventor: Myung-Kyoon Chung, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 759 days.

(21) Appl. No.: 14/227,144

(22) Filed: Mar. 27, 2014

(65) Prior Publication Data

US 2014/0327991 A1 Nov. 6, 2014

(30) Foreign Application Priority Data

May 2, 2013 (KR) .................. 10-2013-0049594

(51) Int. Cl.
*H02H 5/08* (2006.01)
(52) U.S. Cl.
CPC .................. *H02H 5/083* (2013.01)
(58) Field of Classification Search
CPC .................. H02H 5/083; G01N 27/048
See application file for complete search history.

(56) References Cited

U.S. PATENT DOCUMENTS

| 7,557,466 B2* | 7/2009 | Wong | H02H 5/083 307/118 |
| 8,776,597 B2* | 7/2014 | Waga | G01N 27/225 73/335.04 |
| 9,146,207 B2* | 9/2015 | Harper | G06F 1/1656 |
| 2010/0033883 A1* | 2/2010 | Simon | H02H 5/083 361/52 |
| 2010/0206046 A1* | 8/2010 | Bentley | G01L 19/0023 73/29.02 |
| 2011/0005313 A1* | 1/2011 | Vernon | G01N 27/225 73/335.04 |
| 2012/0038374 A1* | 2/2012 | Johnson | G01M 3/045 324/694 |
| 2013/0166224 A1* | 6/2013 | Carlsen, Jr. | G01N 27/121 702/24 |
| 2015/0346127 A1* | 12/2015 | Kalinichev | G01N 27/048 361/86 |

FOREIGN PATENT DOCUMENTS

| JP | 2010-35036 A | 2/2010 |
| KR | 10-2005-0006577 A | 1/2005 |
| KR | 10-2005-0078582 A | 8/2005 |
| KR | 10-2011-0036079 A | 4/2011 |

* cited by examiner

*Primary Examiner* — Stephen W Jackson
*Assistant Examiner* — Christopher Clark
(74) *Attorney, Agent, or Firm* — Cha & Reiter, LLC.

(57) ABSTRACT

An electronic device comprising a Printed Circuit Board (PCB), a battery for supplying power to the PCB and at least one moisture detection sheet mounted on the PCB and the PCB shuts off power from the battery in response to detected electrical current conduction via the at least one moisture detection sheet.

18 Claims, 21 Drawing Sheets

USER EQUIPMENT AND OPERATING METHOD THEREOF

CLAIM OF PRIORITY

This application claims the benefit under 35 U.S.C. §119(a) of a Korean patent application filed in the Korean Intellectual Property Office on May 2, 2013 and assigned Serial No. 10-2013-0049594, the entire disclosure of which is hereby incorporated by reference.

BACKGROUND

1. Technical Field

The present system concerns user equipment (UE) that may reduce damage from moisture, for example.

2. Description of the Related Art

User equipment (UE) such as a mobile communication terminal (a cellular phone), an electronic scheduler, a Personal Digital Assistant (PDA), for example, provide various data transmission and other services as well as a voice communication service in the form of a multimedia communication device. UE is often expensive and costly for a user to fix particularly where water is introduced to the inside of the UE. This frequently results in circuitry and other parts being damaged due to an overcurrent condition, for example. Also a user typically needs to remove a battery and dry the UE the device, but the device circuitry may still be unavoidably damaged before the battery is removed. Therefore, an alternative for minimizing damage of the UE induced by water is desired.

SUMMARY

A system detects water via electrical current flow due to moisture on a detection sheet and reduces circuit damage in a UE due to introduction of water by shutting off battery power supplied to the electronic parts even when a battery is connected. A Power Manager Integrated Circuit (PMIC) or a processor may, record (location and time) and forcibly power off or shut down UE in response to detection of moisture in the UE and a load switch controlled by the PMIC may shut off battery power supplied to a load. A processor controls display of recorded data concerning moisture in UE prior to rebooting.

An electronic device comprises a Printed Circuit Board (PCB), a battery for supplying power to the PCB and at least one moisture detection sheet mounted on the PCB and the PCB shuts off power from the battery in response to detected electrical current conduction via the at least one moisture detection sheet.

In a feature, a detector detects electrical current conduction via the at least one moisture detection sheet; at least one Power Management Integrated Circuit (PMIC) regulates power from a battery to power the electronic device; and at least one load switch supplies the regulated power to a module within the electronic device, wherein the at least one PMIC controls the at least one load switch to shut off the regulated power to the module. In response to the detected electrical current conduction, the PCB operates power-off or shut-down of at least one module with the electronic device and in response to the detected electrical current conduction, the PCB records detected moisture information. Further, in response to a power-on signal occurring after the power-off, the PCB performs a boot operation and displays the detected moisture information. The detected electrical current conduction is detected by at least one Power Management Integrated Circuit (PMIC) mounted on the PCB.

In another feature, the PCB detects the electrical current conduction by detecting a change in an Analog-to-Digital Conversion (ADC) value associated with electrical conductivity of the at least one moisture detection sheet. The PCB detects the electrical current conduction by detecting a potential voltage difference between both ends of the at least one moisture detection sheet and both ends of the moisture detection sheet are fixed at a first conductive pad and a second conductive pad formed on the PCB. Also the first conductive pad or the second conductive pad is electrically connected to a ground potential and a pull-down resistor or a pull-up resistor is mounted on a pattern on the PCB electrically connected with the first pad or the second pad.

In yet another feature, a conductive member is electrically attached to the first conductive pad and the second conductive pad, respectively, wherein both ends of the at least one moisture detection sheet contact the conductive member, respectively. Further, the conductive member comprises: a mount portion electrically attached to the first conductive pad and the second conductive pad; and a clip portion extending upward from the mount portion and holding the at least one moisture detection sheet. The conductive member comprises: a mount portion electrically attached to the first conductive pad and the second conductive pad; and a clip portion extending upward from the mount portion and elastically pressurizing the at least one moisture detection sheet. The at least one moisture detection sheet is attached on an inner surface of a housing of the electronic device. A conductive sheet attached on an inner surface of a housing of the electronic device, wherein both ends of a first moisture detection sheet are attached to a first pad and the conductive sheet, respectively, and both ends of a second moisture detection sheet are attached to a second pad and the conductive sheet, respectively. In an additional feature, a metal plate is located to overlap the PCB and electrically connected with a ground of the PCB, wherein both ends of the at least one moisture detection sheet are attached to the metal plate and at least one conductive pad formed on the PCB.

In a further feature, a method protects an electronic device from moisture damage. The method comprises deriving electrical power from a battery and detecting moisture by detecting electrical current conduction occurring between conductors in response to moisture. In response to the detected electrical current, the method inhibits conduction of the derived electrical power to electrical circuitry within the electronic device. Detected moisture information is recorded. Power initialization of the electronic device is performed in response to a power-on signal following power-off of the electronic device and the detected moisture information is displayed.

Other aspects, advantages and salient features will become apparent to those skilled in the art from the following detailed description, which, taken in conjunction with the annexed drawings, discloses exemplary embodiments.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION

The following description with reference to the accompanying drawings is provided to assist in a comprehensive understanding of exemplary system embodiments. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings. Accordingly, it should be apparent to those skilled in the art that the following description is for illustration purpose only and not for the purpose of limiting the appended claims and their equivalents.

Figure 1:
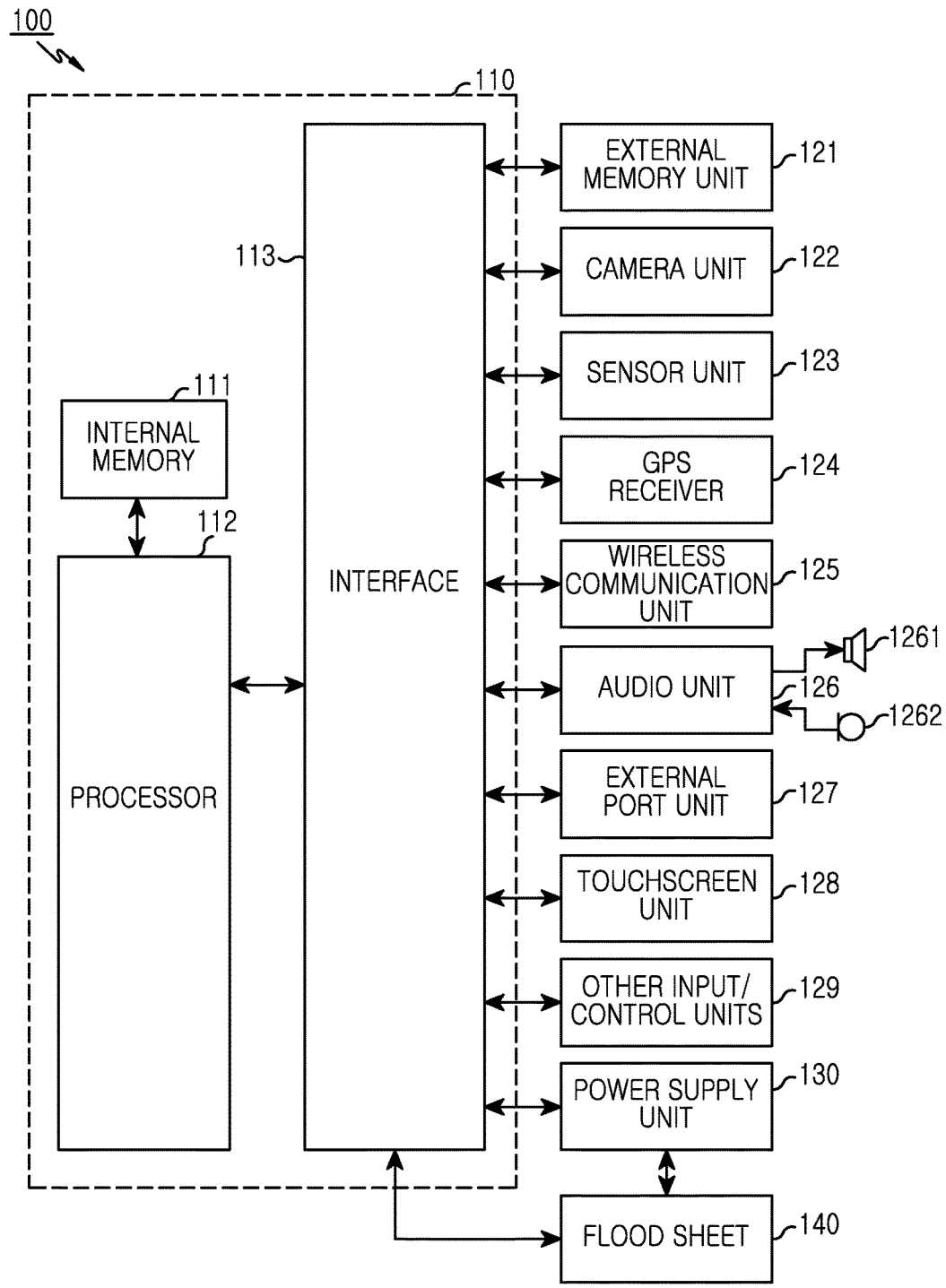
FIG. 1 shows UE according to invention principles.

FIG. 1 shows UE comprising a device such as a mobile phone, a mobile pad, a media player, a tablet computer, a handheld computer, and a Personal Digital Assistant. The UE may be a mobile terminal including a composite device combining two or more functions of these devices. The UE 100 may include a host device 110, an external memory unit 121, a camera unit 122, a sensor unit 123, a Global Positioning System (GPS) receiver 124, a wireless communication unit 125, an audio unit 126, an external port unit 127, a touchscreen unit 128, other input/control units 129, a power supply unit 130, and a non-conductive moisture detection sheet 140. A plurality of external memory units 121 and external port units 127 may be provided. The host device 110 may include an internal memory 111, one or more processors 112, and an interface 113 that may be separate elements, or may be configured in one or more integrated circuits.

The processor 112 may execute different software programs to perform different functions for the UE 100, and control voice communication, video communication, and data communication. In addition to these general functions, the processor 112 may execute a software program (an instruction set) stored in the internal memory 111 and/or the external memory unit 121 to perform different functions. The processor 112 may include one or more data processors, image processors, CODEC processors, communication processors, application processors, for example. The interface 113 may connect different units of the UE 100 with the host device 110. The external memory unit 121 may include a high speed random access memory such as one or more magnetic disk devices and/or a non-volatile memory, one or more optical disk storages and/or a flash memory (for example, NAND, NOR). The external memory unit 121 stores software (a set of instructions or program) that may include an Operating System (OS) program, a communication program, a graphics program, a user interface program, a codec program, and one or more application programs.

The OS program comprises WINDOWS, LINUX, Darwin, RTXC, UNIX, OS X, or a built-in OS such as VxWorks. The OS program may include different software elements for controlling general system operation. A control of the general system operation may include memory management and control, storage hardware (device) control and management, power control and management. The OS program may also perform a function for swift communication between different hardware units (devices) and software elements (programs). The communication program may enable communication with counterpart UE such as a computer, a server, and UE via the wireless communication unit 125 or the external port unit 127. The graphics program may include different software elements for providing and displaying graphics on the touchscreen unit 128. Graphics elements may comprise text, a web page, an icon, a digital image, a video, or an animation, for example. The user interface program may include different software elements related to a user interface comprising content regarding how a state of a user interface changes and under which conditions a user interface changes, for example. The codec program may include a software element related to encoding and decoding of a video file. A camera program may include a camera-related software element enabling camera-related processes and functions. The application program may include a browser program and programs for processing, an e-mail, an instant message and text as well as a program supporting keyboard emulation, an address book, a touch list, a widget, Digital Rights Management (DRM), voice recognition, voice duplication, a position determining function and a location based service, for example.

The external memory unit 121 may include an additional program (instructions) besides the above-described programs. Different functions of the UE 100 may be executed by one or more stream processing units including an Application Specific Integrated Circuit (ASIC) and/or a software, and/or a combination thereof. The camera unit 122 may perform a camera function such as acquisition of a photo, video clip recording, for example. The camera unit 122 may include a Charged Coupled Device (CCD) or a Complementary Metal-Oxide Semiconductor (CMOS), for example.

The camera unit 122 may change a hardware configuration, for example, control lens movement, an F number of an aperture, for example. Different elements of the UE 100 may be connected via one or more communication buses (reference numeral not shown) or stream lines (reference numeral not shown). The sensor unit 123 may include a movement sensor, a light sensor, a temperature sensor, for example, and enable different functions and may detect movement of the UE 100, and the light sensor may detect ambient light. The GPS receiver 124 may receive a signal sent by a GPS satellite to calculate a current position.

The wireless communication unit 125 enables wireless communication and may include a Radio Frequency (RF) transceiver, a light (for example, an infrared) transceiver. The wireless communication unit 125 may include a module including at least one antenna and an RF connector, for example. The wireless communication unit 125 may operate via one of, a Global System for Mobile Communication (GSM) network, an Enhanced Data GSM Environment (EDGE) network, a Code Division Multiple Access (CDMA) network, a Wide (W)-CDMA network, a Long Term Evolution (LTE) network, an Orthogonal Frequency Division Multiple Access (OFDMA) network, a Wireless Fidelity (Wi-Fi) network, a WiMax network and/or a Bluetooth network depending on a communication network. The audio unit 126 is connected to a speaker 1261 and a microphone 1262 to take charge of voice recognition, voice duplication, digital recording, and audio input and output such as a communication function, for example, and may include an audio amplifier. The audio unit 126 allows communication with a user via the speaker 1261 and the microphone 1262. The audio unit 126 may receive a data signal from the host device 110, convert the received data signal to an electric signal, and output the converted electric signal via the speaker 1261. The speaker 1261 may convert an the electric signal into an audible frequency band and output the same, and the microphone 1262 may convert a sound wave transferred from a person or other sound sources to an electric signal. The audio unit 126 may receive the electric signal from the microphone 1262, convert the received electric signal to an audio data signal, and transmit the converted audio data signal to the host device 110. The audio unit 126 may include an earphone, a headphone or a head set detachable from the UE 100.

The external port unit 127 may directly connect the UE 100 with another UE, or indirectly connect the UE 100 with another UE via a network (for example, the Internet, an Intranet, a wireless Local Area Network (LAN)). The touchscreen unit 128 may provide an input and output interface between the UE 100 and a user. The touchscreen unit 128 detects and communicates data indicating user touch input to the host device 110, and may show visual information provided from the host device 110, for example, text, graphics, video, for example, to a user. The touchscreen unit 128 includes a display for displaying an image comprising one of, an Electron Wetting Display (EWD), an E-Paper, a Plasma Display Panel (PDP), a Liquid Crystal Display (LCD), an Organic Light Emitting Diode (OLED) display, and an Active Matrix Organic Light Emitting Diodes (AMOLED) display. The touchscreen unit includes a device for receiving a touch, and this device may be one of a digitizer for a stylus pen, a capacitive overlay touch panel, a resistance overlay touch panel, a surface acoustic wave touch panel, and an infrared beam touch panel.

The other input/control units 129 may include an up/down button for volume control and at least one of a push button, a locker button, a locker switch, a thumb-wheel, a dial, a stick, and a pointer device such as a stylus pen, for example. The power supply unit 130 may include at least one Power Management Integrated Circuit (PMIC) that may regulate battery power and at least one load switch. For example, the processor 112 transmits an interface signal identifying a load to be powered by power supply unit 130, and the power supply unit 130 regulates a voltage supplied to the processor 112 in response. The processor 112 may use minimum power from power supply unit 130. A PMIC may be used for the host device 110, and a PMIC is used for external memory unit 121, the camera unit 122, the sensor unit 123, the GPS receiver 124, the wireless communication unit 125, the audio unit 126, the external port unit 127, the touchscreen unit 128, and the other input/control units 129. An integrated PMIC may be configured to regulate battery power for external memory unit 121, the camera unit 122, the sensor unit 123, the GPS receiver 124, the wireless communication unit 125, the audio unit 126, the external port unit 127, the touchscreen unit 128, and the other input/control units 129 as well as the host device 110. The PMIC may control power-on, power-off, and a reset function via a button interface, or a pin input, for example.

A load switch may provide or shut off battery power to at least one module for each function under control of the PMIC. The PMIC may measure an Analog-to-Digital Conversion (ADC) value regarding permittivity and electrical conductivity of the moisture detection sheet 140. The PMIC sets an initial ADC value. The initial ADC value may correspond to the permittivity of the moisture detection sheet 140 not wetted with water. In the case where the moisture detection sheet 140 is in contact with water, the permittivity changes, and the PMIC may recognize a change in the ADC value of the moisture detection sheet 140. In response to detected change in the ADC value, the PMIC does not supply regulated battery power to a module for each function but may perform a power-off operation or a shutdown operation for controlling the load switch to shut off the battery power to a module for individual functions. The PMIC may perform a power-off operation under control of the host device 110, or power-off independently without a control of the host device 110. The module for each function may be at least one of the external memory unit 121, the camera unit 122, the sensor unit 123, the GPS receiver 124, the wireless communication unit 125, the audio unit 126, the external port unit 127, the touchscreen unit 128, and the other input/control units 129. In response to detecting a change in the ADC value of the moisture detection sheet 140, the PMIC may transmit a power-off enable signal to the host device 110. The host device 110 records log information (hereinafter, detected moisture information) concerning detected moisture, and may control the PMIC to forcibly power off the UE 100. Since the power to the host device 110 is shut off when power is turned off, damage to the data processor, the image processor, the CODEC processor, the communication processor, the application processor, for example, of the host device 110 by moisture may be prevented or at least reduced. After the UE 100 is forcibly powered-off in response to detected moisture, upon a user pressing a power-on button, the host device 110 detects a power-on signal from the PMIC and performs a boot operation. The host device 110 may display recorded detected moisture information and data identifying a predetermined moisture management method used via a popup window. A user is alerted to moisture in the UE 100, and is able to take a moisture mitigation action such as initiating natural drying after battery removal. The detected moisture information may identify time of detection and location of moisture, for example. The host device 110 may obtain different information concerning moisture via the sensor unit 123, the camera unit 122, and the GPS receiver 124, and include the information in the detected moisture information. For example, the host device 110 may recognize moisture, and incorporate location data obtained via the GPS receiver 124 in the detected moisture information. The host device 110 may recognize moisture, and incorporate an image from the camera unit 122 in the detected moisture information. The detected moisture information is used for repair of the moisture impaired UE 100.

Both the PMIC and the host device 110 may measure an Analog-to-Digital Conversion (ADC) value concerning permittivity of the moisture detection sheet 140. The host device 110 sets an initial ADC value comprising the permittivity of the dry moisture detection sheet 140. In the case where the moisture detection sheet 140 is in contact with water, the permittivity of the moisture detection sheet 140 changes, and the host device 110 may recognize a change in the ADC value of the moisture detection sheet 140. In response to a detected change in the ADC value of the moisture detection sheet 140, the host device 110 sends a power-off enable signal to the power supply unit 130, and the PMIC of the power supply unit 130 controls the load switch to shut off battery power to modules supporting individual functions, and performs a power-off procedure terminating the regulated battery power provided to a module for each function. The host device 110 sends a power-off enable signal to the load switch of the power supply unit 130, and the load switch may shut off the battery power to individual modules supporting individual functions. In response to detecting a change in the ADC value of the moisture detection sheet 140, the host device 110 records detected moisture information. In response to the UE 100 being forcibly powered-off due to detected moisture, upon a user pressing a power-on button, the host device 110 detects a power-on signal from the PMIC, and performs a boot operation. The host device 110 may display recorded detected moisture information and data indicating a management method via a popup window. A user is alerted to detected moisture in the UE 100, and is able to take moisture mitigation action.

The power supply unit 130 may further include a comparator. When the moisture detection sheet 140 is in contact with water, a voltage is applied to the moisture detection sheet 140 and change in sheet resistance is detected. A comparator may compare a voltage related parameter derived from the moisture detection sheet 140 with a reference parameter, and in response output a power-off signal to the load switch, the PMIC, or the host device 110. For example, when a parameter derived from the moisture detection sheet 140 is lower than the reference parameter, the comparator may output a low signal (a power-off enable signal) to the load switch. The load switch may shut off battery power to individual modules for individual functions. The comparator may send a power-off enable signal to the PMIC or the host device 110. The host device 110 may record detected moisture information from the power-off enable signal, and control the PMIC to forcibly power off the UE 100. When receiving the power-off enable signal from the comparator, the PMIC may perform power-off independently without control by the host device 110 and the comparator may be included in the host device 110.

Figure 2:
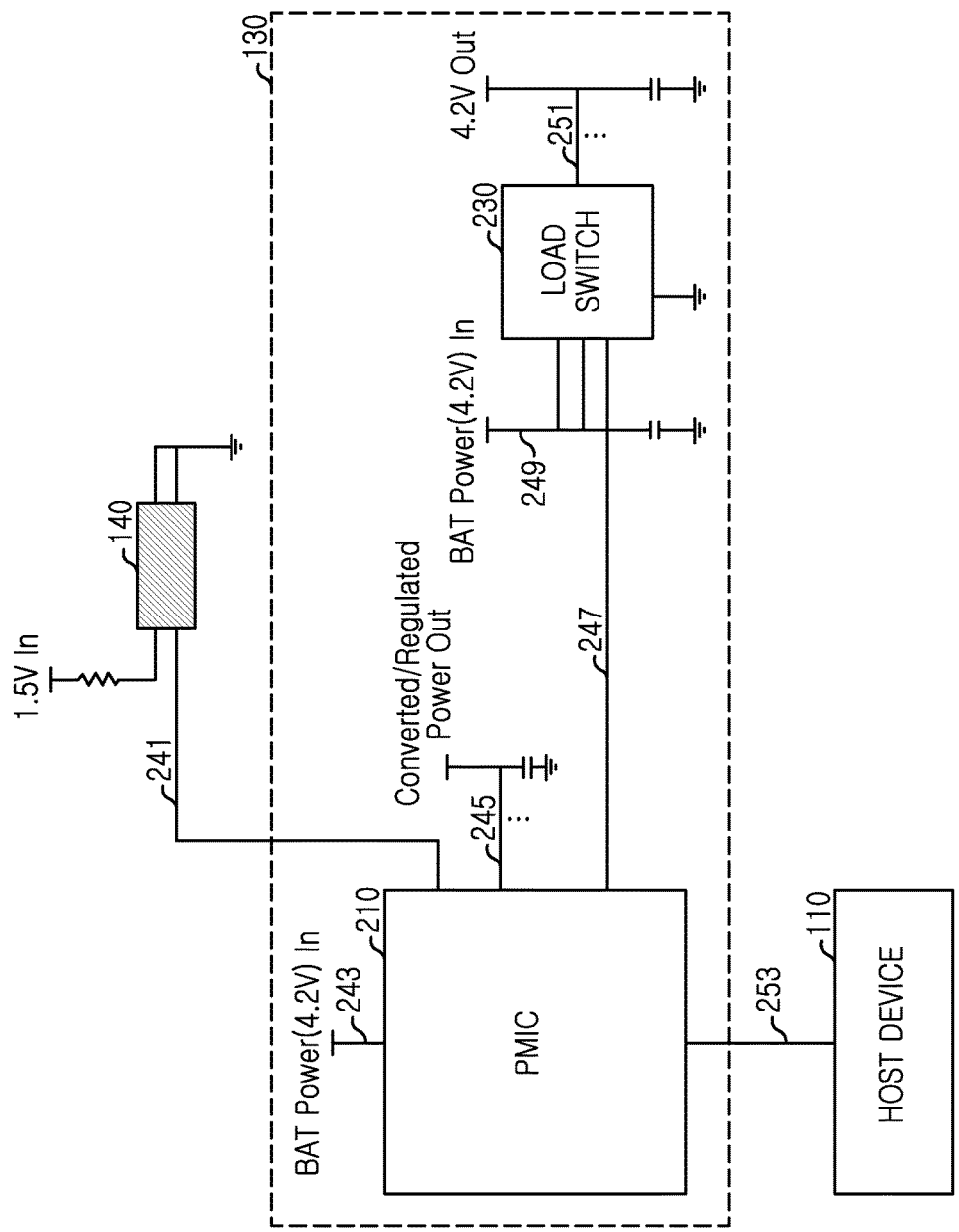
FIG. 2 shows a battery power shut-off circuit of UE according to invention principles.

FIG. 2 shows a battery power shut-off circuit used in UE where, the battery power shut-off circuit may include the host device 110, the power supply unit 130, and the non-conductive moisture detection sheet 140. The host device 110 may receive an enable signal (a power-off enable signal) in response to detected moisture from the power supply unit 130 via a line 253 connected to the power supply unit 130, to power off the UE 100. The host device 110 may record detected moisture information in the internal memory 111 or the external memory unit 121. In response to detecting a power-on signal from a PMIC 210 of the power supply unit 130, the host device 110 may perform booting and display recorded detected moisture information and a management method via a popup window on the touchscreen unit 128. For the power-off enable signal, a General Purpose Input/Output (GPIO) may be used. The power supply unit 130 may include the PMIC 210 and a load switch 230. The PMIC 210 may receive battery power (BAT power, 4.2 V) via a line 243 connected to the battery, regulate the input battery power to power suitable for a load of a module for individual functions, and output the regulated power via a line 245 connected to the module for each function.

The PMIC 210 may measure an ADC value concerning permittivity of the moisture detection sheet 140 via a line 241 connected to the moisture detection sheet 140. The PMIC 210 acquires and stores an initial ADC value. The initial ADC value may correspond to the permittivity of the dry moisture detection sheet 140. Where the moisture detection sheet 140 is in contact with water, the permittivity of the moisture detection sheet 140 changes, and the PMIC 210 may recognize a change in the ADC value of the moisture detection sheet 140 and output an enable signal via a line 247 connected to a load switch 230. The PMIC 210 may output an enable signal (a power-off enable signal) associated with detected moisture via a line 253 connected to the host device 110. When recognizing a change in the ADC value of the moisture detection sheet 140, the PMIC 210 may forcibly shut off power to a module (ex: the host device 110) for each function independently without control by the host device 110. When receiving an enable signal associated with detected moisture from the PMIC 210, the host device 110 may perform power-off of the UE 100, and the PMIC 210 may perform a power-off procedure.

The load switch 230 may receive battery power (BAT power) via a line 249 connected to the battery, and output the received battery power via a line 251 connected to at least one module for each function. The module for each function may be one of the external memory unit 121, the camera unit 122, the sensor unit 123, the GPS receiver 124, the wireless communication unit 125, the audio unit 126, the external port unit 127, the touchscreen unit 128, and the other input/control units 129. The load switch 230 may receive an enable signal (a power-off enable signal) associated with detected moisture from the PMIC 210 via the line 247 connected to the PMIC 210, and shut off the battery power via the line 251 for each function to reduce moisture associated damage. One side of the moisture detection sheet 140 may be connected to power (1.5 V) regulated by the PMIC 210, and the other side of the moisture detection sheet 140 may be grounded. When conductive fluid such as water, for example, permeates, the moisture detection sheet 140 it changes electrical current flow. As illustrated, a circuit related to the moisture detection sheet 140 may form a pull-up resistor at a line connecting the moisture detection sheet 140 with power, or may form a pull-down resistor at a line connecting the moisture detection sheet 140 with the ground.

Figure 3:
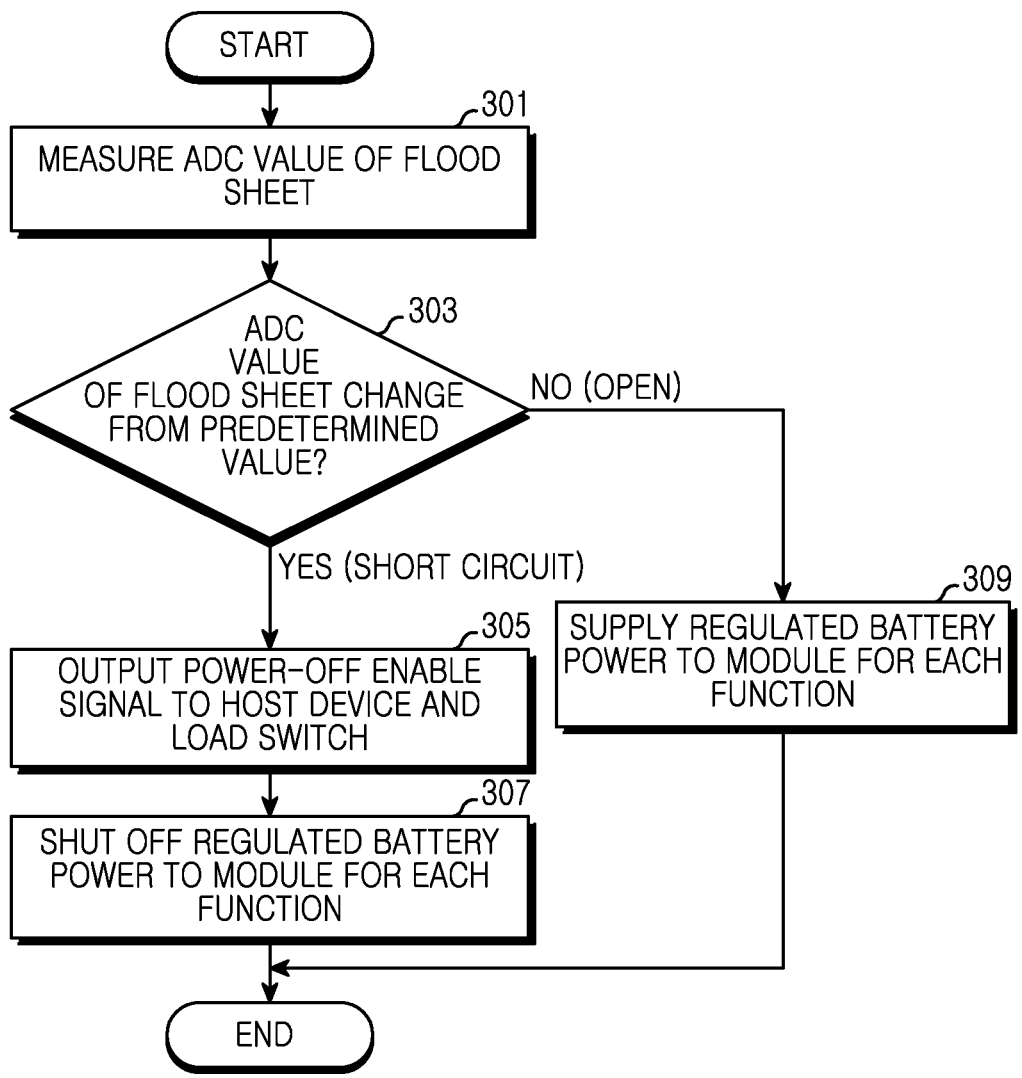
FIG. 3 shows a flowchart of a method of operation of a PMIC of FIG. 2 according to invention principles.

FIG. 3 shows a flowchart of a method of operation of a PMIC of FIG. 2 where the PMIC 210 may measure an ADC value of the moisture detection sheet 140 in step 301. The PMIC 210 may determine whether an ADC value of the moisture detection sheet 140 changes from a predetermined value in step 303. An ADC value of the moisture detection sheet 140 may indicate an electric short-circuit state of the moisture detection sheet 140 or an electric open state of the moisture detection sheet 140. In the case where the ADC value of the moisture detection sheet 140 does not change, the PMIC 210 may supply regulated battery power to a module for each function in step 309. In the case where the ADC value of the moisture detection sheet 140 changes, the PMIC 210 may output a power-off enable signal to the host device 110 and the load switch 230 in step 305.

The PMIC 210 may shut off regulated battery power supplied to a module for one or more individual functions including the host device 110, in step 307. The PMIC 210 may forcibly shut off power to the module for each function independently 20 without control by the host device 110 according to a procedure of the host device 110.

Figure 4:
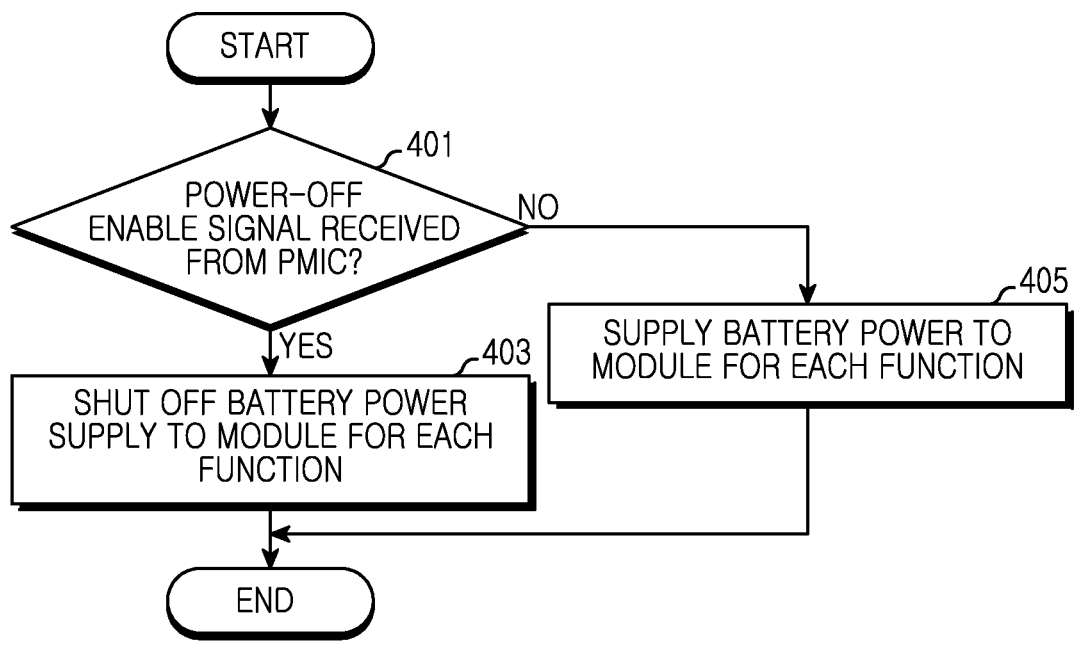
FIG. 4 shows a flowchart of a method of operation of a load switch of FIG. 2 according to invention principles.

FIG. 4 shows a flowchart of a method of operation of a load switch of FIG. 2 where the load switch 230 may determine whether a power-off enable signal is received from the PMIC 210 in step 401. When receiving the power-off enable signal from the PMIC 210, the load switch 230 may shut off battery power supplied to modules for individual UE functions in step 403. When a power-off enable signal is not received from the PMIC 210, the load switch 230 supplies the battery power to the modules providing functions in step 405.

Figure 5:
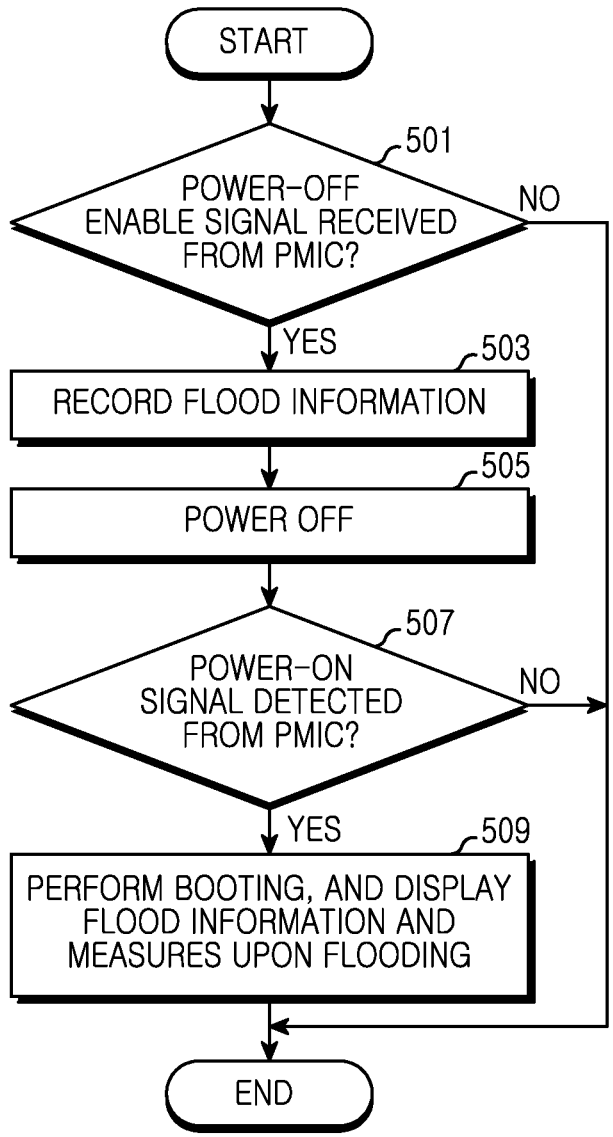
FIG. 5 shows a flowchart of a method of operation of a host device of FIG. 2 according to invention principles.

FIG. 5 shows a flowchart of a method of operation of a host device of FIG. 2 where the host device 110 may determine whether a power-off enable signal is received from the PMIC 210 in step 501. In response to the power-off enable signal being received from the PMIC 210, the host device 110 may record detected moisture information in the internal memory 111 or the external memory unit 121 in step 503. The host device 110 may perform power-off in step 505. The PMIC 210 may shut off power to one or more modules providing individual UE functions using a power-off method of the host device 110. Further, the host device 110 may determine whether a power-on signal from the PMIC 210 is received in step 507 and if so, the host device 110 performs a boot operation and displays recorded detected moisture information and data identifying a power management method used in step 509.

Figure 6:
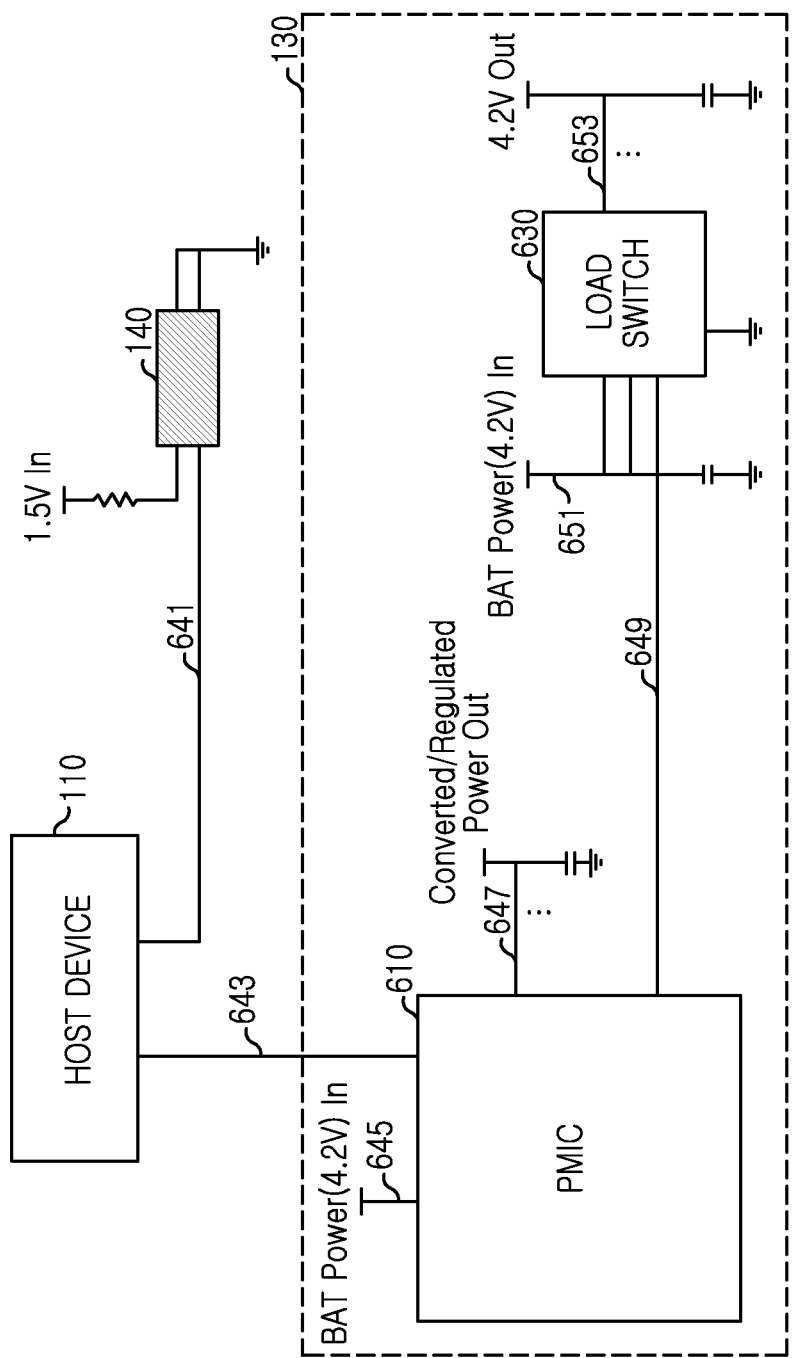
FIG. 6 shows a battery power shut-off circuit of UE according to invention principles.

FIG. 6 shows a battery power shut-off circuit of UE including a host device 110, a power supply unit 130, and a non-conductive moisture detection sheet 140. The host device 110 may measure an Analog-to-Digital Conversion (ADC) value indicating permittivity of the moisture detection sheet 140 received via a line 641. The host device 110 sets an initial ADC value. The initial ADC value may correspond to the permittivity of a dry moisture detection sheet 140. In the case where the moisture detection sheet 140 is in contact with water, the permittivity of the moisture detection sheet 140 changes, and the host device 110 may detect a change in the ADC value of the moisture detection sheet 140. When recognizing a change in the ADC value of the moisture detection sheet 140, the host device 110 may output a power-off enable signal via a line 643 connected to the PMIC 610 of the power supply unit 130. The host device 110 may record detected moisture information in an internal memory 111 or an external memory unit 121. When detecting a power-on signal from the PMIC 610 of the power supply unit 130, the host device 110 controls booting and displays recorded detected moisture information and data identifying a management method via the touchscreen unit 128. For the power-off enable signal, a General Purpose Input/Output (GPIO) may be used.

The power supply unit 130 may include the PMIC 610 and a load switch 630. The PMIC 610 may receive battery power (BAT power, 4.2 V) via a line 645 connected to a battery, regulate the received battery power for the load of a module providing each function, and output the regulated power via a line 647 connected to the module providing each function. The load switch 630 may receive the battery power (BAT power) via a line 651 connected to the battery, and output the received battery power via a line 653 connected to at least one module for each function. The PMIC 610 may receive a power-off enable signal of the UE 100 from the host device 110 via a line 643 connected to the host device 110, and shut off power to a module for each function according to a power-off procedure. The PMIC 610 may output a power-off enable signal via a line 649 connected to the load switch 630. The load switch 630 may receive a power-off enable signal from the PMIC 610 via a line 649 connected to the PMIC 610, and shut off the battery power to the line 653 connected to the module for each function. Since the battery power to the module for each function is shut off, damage of the module for each function due to moisture may be reduced. One side of the moisture detection sheet 140 may be connected to power (1.5 V), and the other side of the moisture detection sheet 140 may be grounded. Power connected to the moisture detection sheet 140 may be regulated by the PMIC 610.

Figure 7:
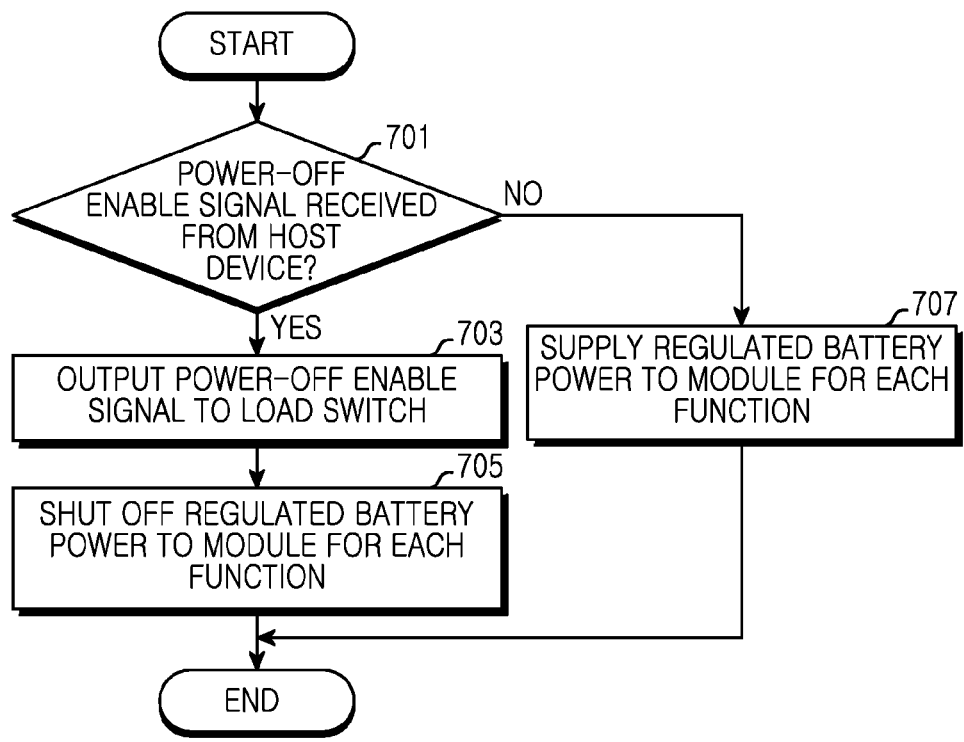
FIG. 7 shows a flowchart of a method of operation of a PMIC of FIG. 6 according to invention principles.

FIG. 7 shows a flowchart of a method of operation of a PMIC of FIG. 6 where the PMIC 610 may determine whether a power-off enable signal is received from the host device 110 in step 701. When not receiving a power-off enable signal from the host device 110, the PMIC 610 may supply regulated battery power to a module for each function in step 707. When receiving a power-off enable signal from the host device 110, the PMIC 210 may output the power-off enable signal to the load switch 630 in step 703. The PMIC 210 may shut off the regulated battery power supplied to the modules for individual functions in step 705.

Figure 8:
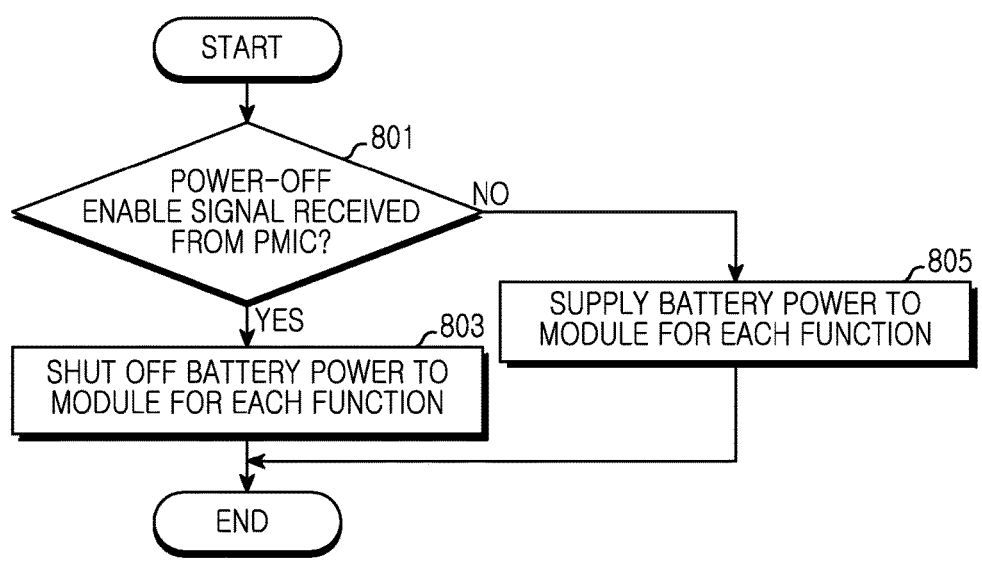
FIG. 8 shows a flowchart of a method of operation of a load switch of FIG. 6 according to invention principles.

FIG. 8 shows a flowchart of a method of operation of a load switch of FIG. 6 where the load switch 630 may determine whether a power-off enable signal is received from the PMIC 610 in step 801. When receiving a power-off enable signal from the PMIC 610, the load switch 630 may shut off battery power to a module for each function in step 803. When not receiving a power-off enable signal from the PMIC 610, the load switch 630 may supply battery power to a module for each function in step 805.

Figure 9:
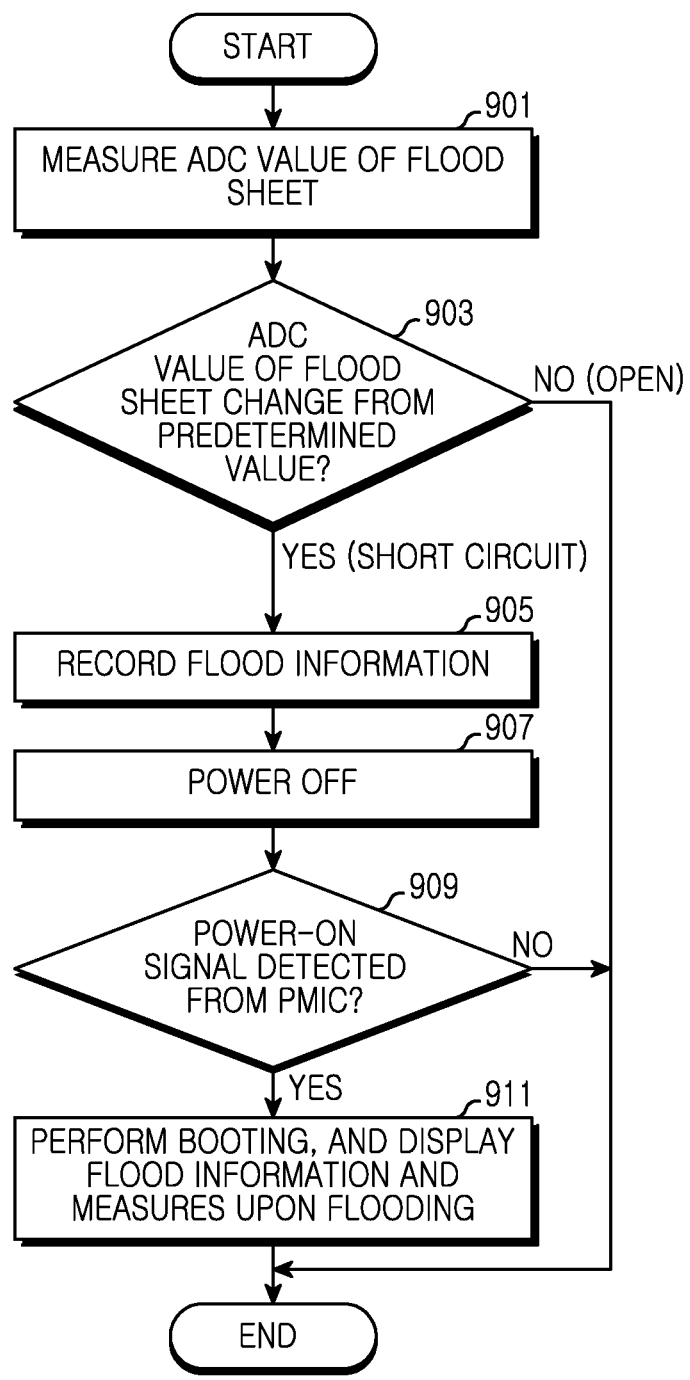
FIG. 9 shows a flowchart of a method of operation of a host device of FIG. 6 according to invention principles.

FIG. 9 shows a flowchart of a method of operation of a host device of FIG. 6 where the host device 110 may measure an ADC value of the moisture detection sheet 140 in step 901. The host device 110 may determine whether the ADC value of the moisture detection sheet 140 changes from a predetermined value in step 903. In the case where the ADC value of the moisture detection sheet 140 changes, the host device 110 may record detected moisture information in the internal memory 111 or the external memory unit 121 in step 905. The host device 110 may perform power off in step 907. During power-off, the host device 110 may output a power-off enable signal to the PMIC 610, and the PMIC 610 may shut off power to a module for each function using a power-off procedure. The host device 110 may determine whether a power-on signal is received from the PMIC 610 in step 909. When a power-on signal is received from the PMIC 610, the host device 110 may perform booting, and display recorded detected moisture information and data indicating a management method on a popup window.

Figure 10:
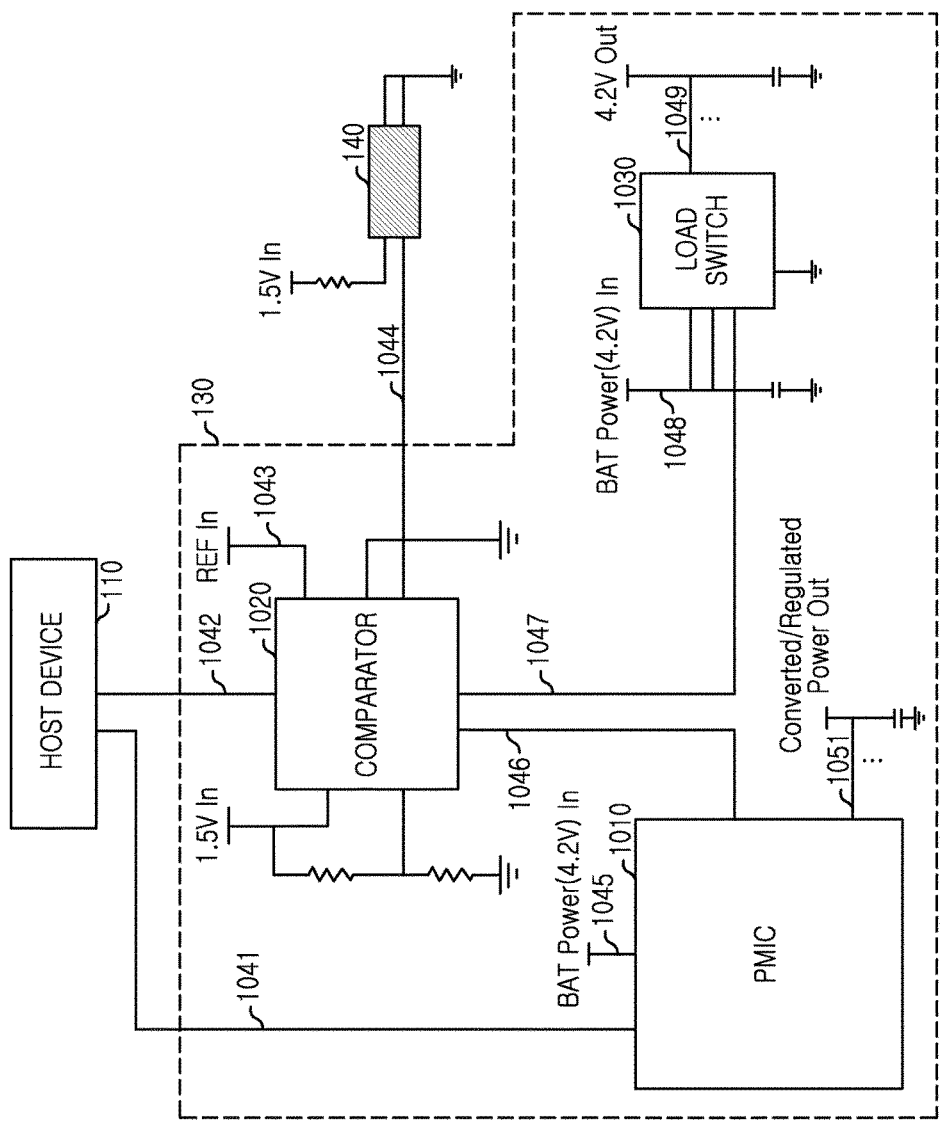
FIG. 10 shows a battery power shut-off circuit of UE according to invention principles.

FIG. 10 shows a battery power shut-off circuit of UE including a host device 110, a power supply unit 130, and a non-conductive moisture detection sheet 140. The host device 110 may receive a power-off enable signal via a line 1042 connected to a comparator 1020 of the power supply unit 130, and power off UE 100. The host device 110 may record detected moisture information in the internal memory 111 or the external memory unit 121. When detecting a power-on signal from the PMIC 1010 of the power supply unit 130, the host device 110 may control booting, and display recoded detected moisture information on a pop-up window via the touchscreen unit 128. The power supply unit 130 may include the PMIC 1010, the comparator 1020, and a load switch 1030. The PMIC 1010 may receive battery power (BAT power, 4.2 V) via a line 1045 connected to the battery, regulate the received battery power of a modules providing respective individual functions, and output the regulated power via a line 1051 connected to the module for each function. The PMIC 1010 may receive a power-off enable signal via a line 1046 connected to the comparator 1020, and employ a power-off procedure of the UE 100. The PMIC 1010 may forcibly shut off power to modules for each function independently without control of the host device 110. When receiving a power-off enable signal from the PMIC 1010, the host device 110 may perform power-off of the UE 100.

The comparator 1020 may form a voltage divide circuit including a line 1044 connected to the moisture detection sheet 140 and a line 1043 to which a reference voltage is applied. One side of the moisture detection sheet 140 is connected with power (1.5 V), and the other side of the moisture detection sheet 140 is grounded. In the case where the moisture detection sheet 140 is in contact with water, a voltage derived by the moisture detection sheet 140 may change. The comparator 1020 compares the reference voltage REF In on line 1043 with the voltage derived by the moisture detection sheet 140 via the line 1044 connected to the moisture detection sheet 140. In the case where the voltage applied to the moisture detection sheet 140 is lower than the reference voltage REF In, the comparator 1020 may output a low signal (power-off enable signal) to the load switch 1030. The comparator 1020 may output a power-off enable signal to the PMIC 1010 and/or the host device 110. Though not shown, the moisture detection sheet 140 may be configured as a pull-up pull-down or other voltage derivation circuit.

The load switch 1030 may receive battery power (BAT power) via a line 1048 connected to the battery, and output the received battery power via a line 1049 connected to at least one module for each function. The load switch 1030 may receive a power-off enable signal via a line 1047 connected to the comparator 1020, and shut off the battery power to the line 1049 connected to the module for each function. Since the battery power to the module for each function is shut-off, damage of the module for each function due to moisture may be reduced.

Figure 11:
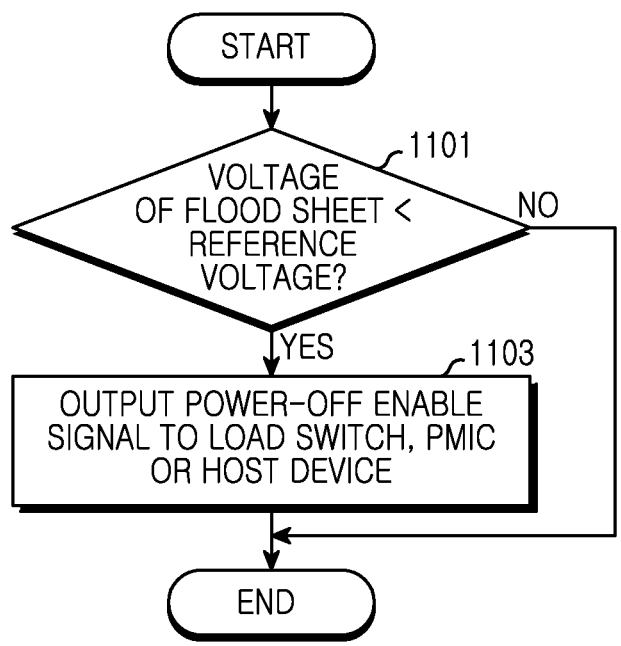
FIG. 11 shows a flowchart of a method of operation of a comparator of FIG. 10 according to invention principles.

FIG. 11 shows a flowchart of a method of operation of a comparator of FIG. 10 where the comparator 1020 may compare a voltage of the moisture detection sheet 140 with the reference voltage, and determine whether the voltage of the moisture detection sheet is low in step 1101. In the case where the voltage of the moisture detection sheet 140 is lower than the reference voltage, the comparator 1020 may output a power-off enable signal to the load switch 1030 or the PMIC or the host device 110 in step 1103.

Figure 12:
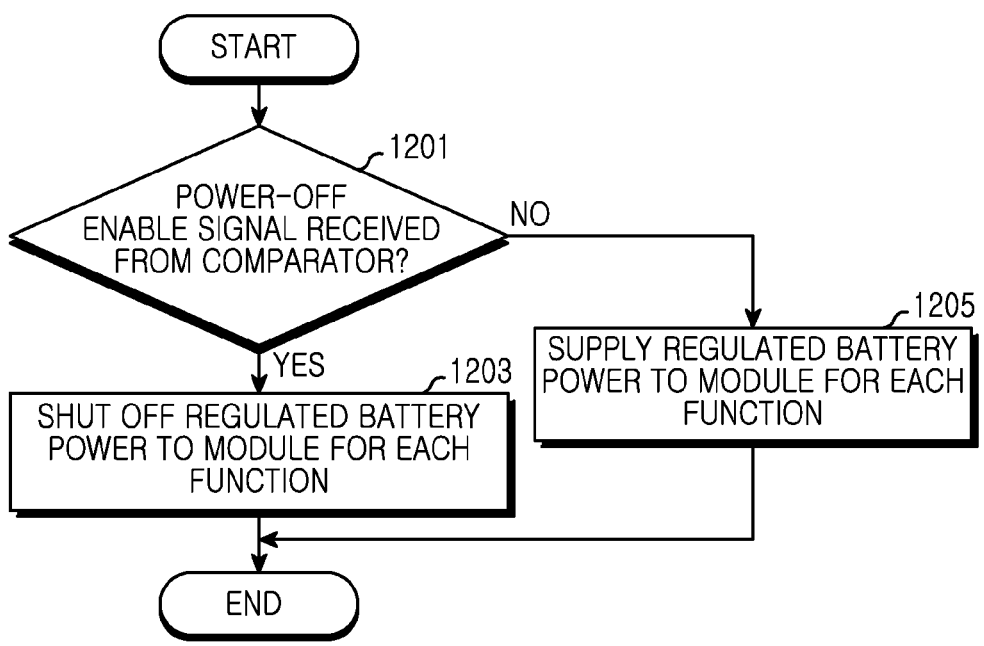
FIG. 12 shows a flowchart of a method of operation of a PMIC of FIG. 10 according to invention principles.
Figure 13:
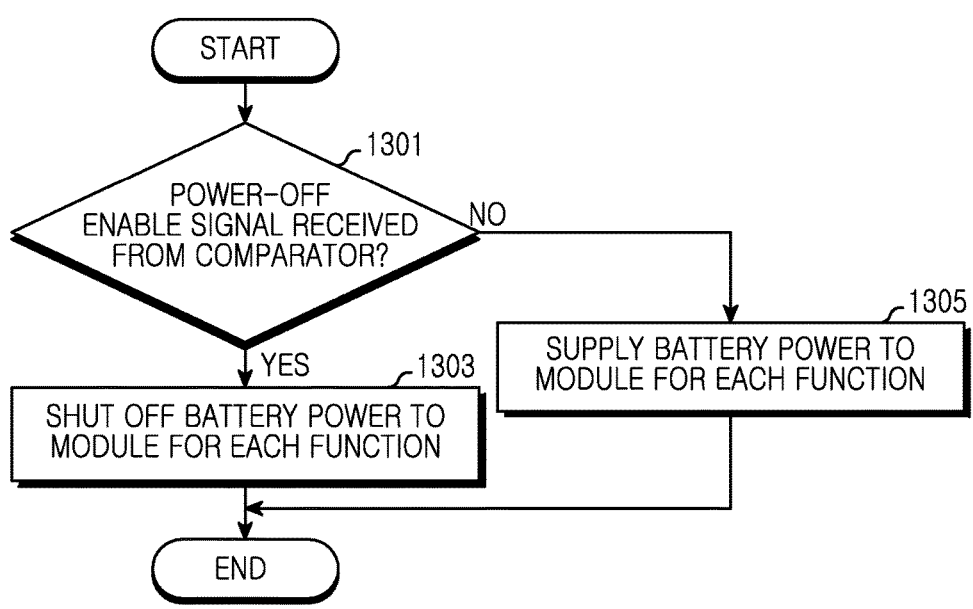
FIG. 13 shows a flowchart of a method of operation of a load switch of FIG. 10 according to invention principles.

FIG. 12 shows a flowchart of a method of operation of a PMIC of FIG. 10 where the PMIC 1010 may determine whether a power-off enable signal is received from the comparator 1020 in step 1201. When receiving a power-off enable signal from the comparator 1020, the PMIC 1010 may shut off regulated battery power supplied to a module for each function in step 1203. When not receiving a power-off enable signal from the comparator 1020, the PMIC 1010 may supply regulated battery power to a module for each function in step 1205. FIG. 13 shows a flowchart of a method of operation of the load switch of FIG. 10 where the load switch 1030 may determine whether a power-off enable signal is received from the comparator 1020 in step 1301. When receiving a power-off enable signal from the comparator 1020, the load switch 1030 may shut off battery power supplied to a module for each function in step 1303. When not receiving a power-off enable signal from the comparator 1020, the load switch 1030 may supply the battery power to a module for each function in step 1305.

Figure 14:
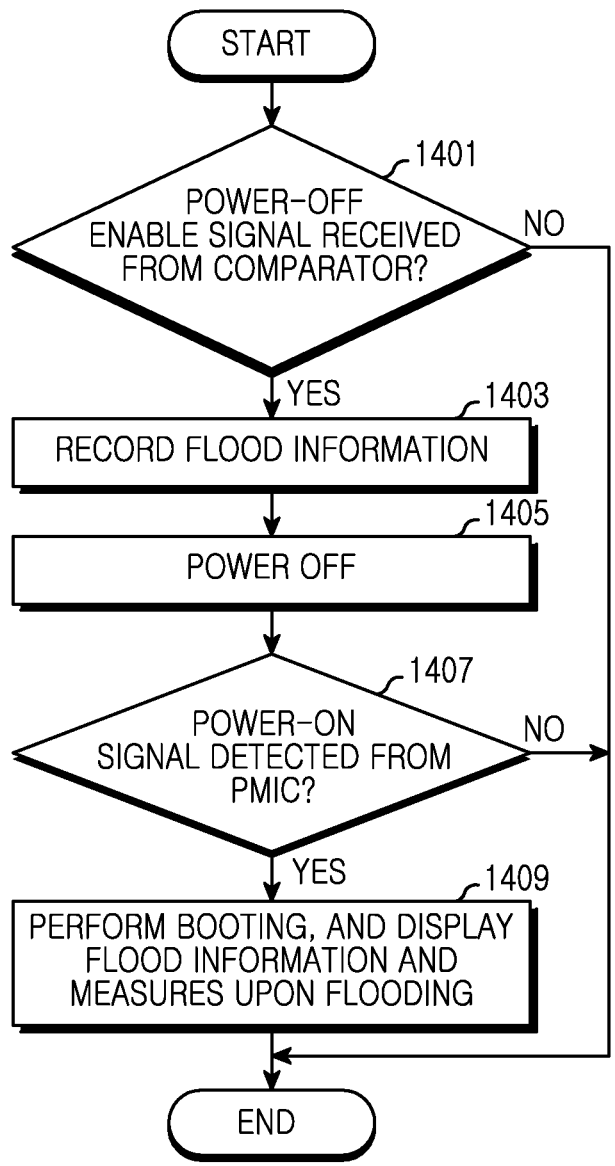
FIG. 14 shows a flowchart of a method of operation of a host device of FIG. 10 according to invention principles.

FIG. 14 shows a flowchart of a method of operation of the host device of FIG. 10 where the host device 110 may determine whether a power-off enable signal is received from the comparator 1020 in step 1401. When receiving a power-off enable signal from the comparator 1020, the host device 110 may record detected moisture information in the internal memory 111 or the external memory device 121 in step 1403. The host device 110 may perform power-off in step 1405. Here, the PMIC 1010 may shut off power to a module for each function using a power-off process of the host device 110. The host device 110 may determine whether a power-on signal is received from the PMIC 1010 in step 1407. In case of receiving a power-on signal from the PMIC 1010, the host device 110 performs a boot operation in step 1409 and may display detected moisture information on a pop-up window.

Figure 15:
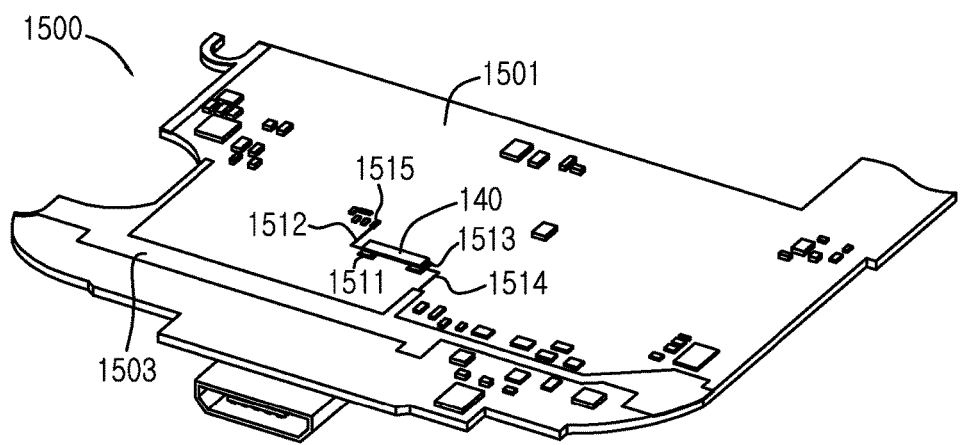
FIG. 15 shows a Printed Circuit Board (PCB) of UE according to invention principles.
Figure 16:
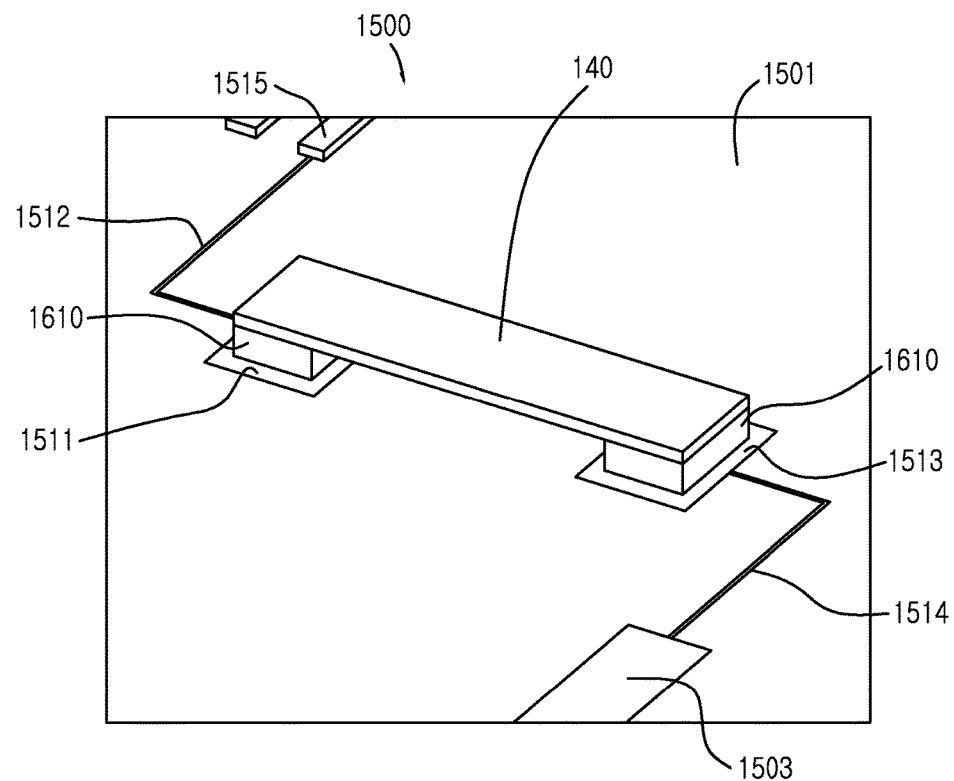
FIG. 16 is a view illustrating a moisture detection sheet of FIG. 15 according to invention principles.

FIG. 15 shows a Printed Circuit Board (PCB) of UE, and FIG. 16 shows a moisture detection sheet of FIG. 15 where the PCB 1500 is a substrate on which a basic circuit and a plurality of electronic parts have been mounted, sets an execution environment of the UE 100, maintains information thereof, allows the UE 100 to be stably operated, and enables data input/output exchange between devices of the UE 100. Units mounted on the PCB 1500 may include host device 110, the external memory unit 121, the camera unit 122, the sensor unit 123, the GPS receiver 124, the wireless communication unit 125, the audio unit 126, the external port unit 127, the touchscreen unit 128, other input/control units 129, the power supply unit 130, the moisture detection sheet 140, for example. The PCB 1500 may include a first pad 1511 and a second pad 1513 connected to a ground 1503. The PCB 1500 may form a first pattern 1512 of a line shape for electrically connecting power with the first pad 1511, and a second pattern 1514 of a line shape for electrically connecting the ground 1503 with the second pad 1513. The PCB 1500 may include a pull-up resistance device 1515 mounted on the first pattern 1512. The PCB 1500 may include a pull-down resistance device mounted on the second pattern 1514. The ends of the moisture detection sheet 140 may be fixed to the first pad 1511 and the second pad 1513 by the medium of a conductive connection member 1610. The conductive connection member 1610 may be a conductive double-sided tape. In the case where conductive fluid (such as water) permeates the moisture detection sheet 140, the moisture detection sheet 140 may conduct electricity, and the first pad 1511 and the second pad 1513 of the PCB 1500 may be electrically connected. In the case where the connection member 1610 has a predetermined height, the moisture detection sheet 140 may be separated from a mounting surface 1501 of the PCB 1500 as illustrated.

Figure 17:
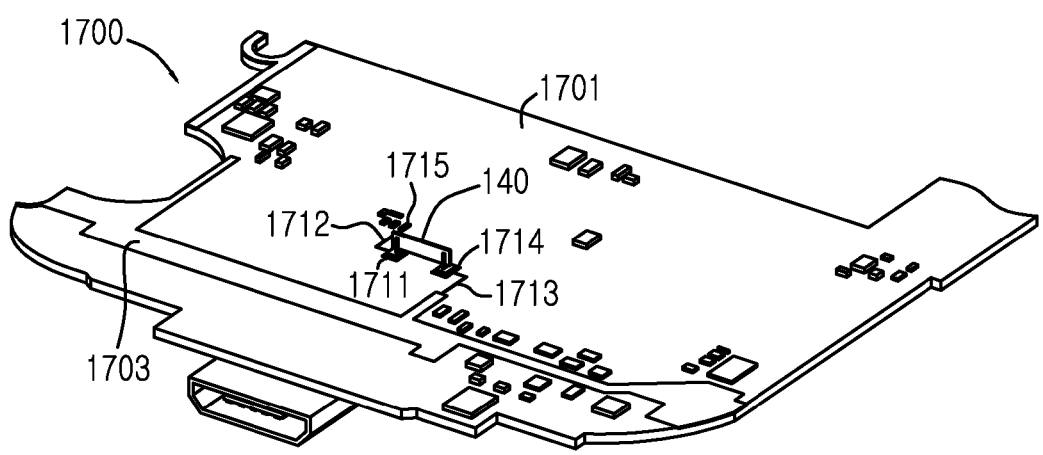
FIG. 17 shows a PCB of UE according to invention principles.
Figure 18:
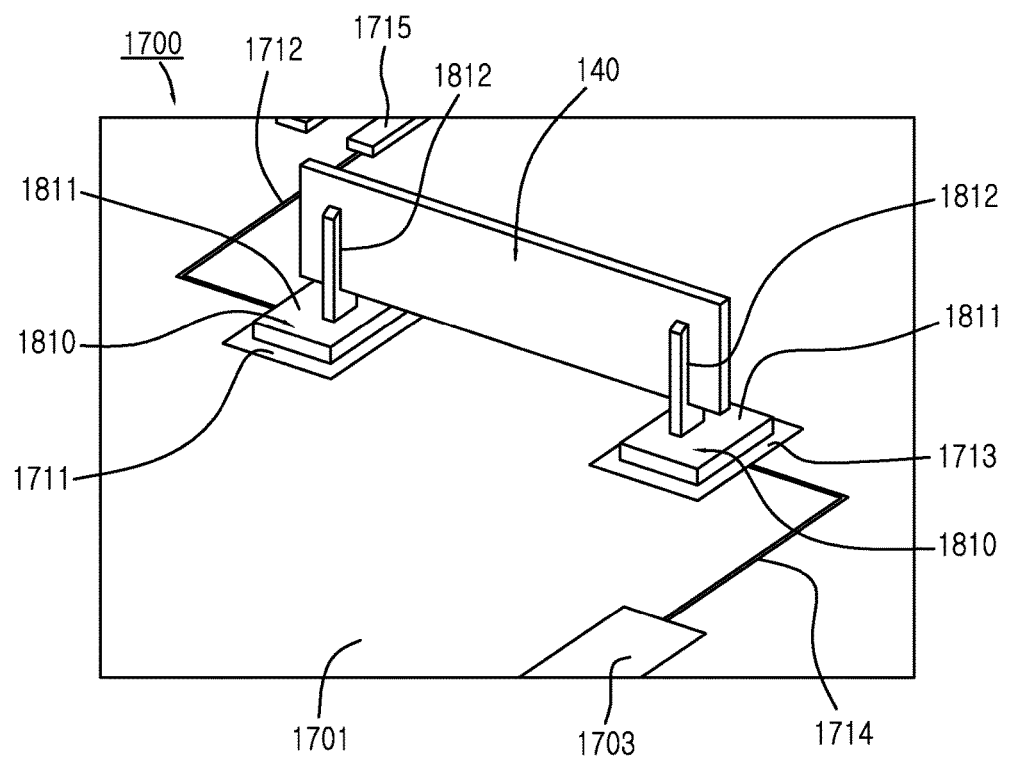
FIG. 18 shows a moisture detection sheet of FIG. 17 mounted according to invention principles.

FIG. 17 shows a PCB of UE and FIG. 18 shows a moisture detection sheet of FIG. 17. The PCB 1700 is a substrate on which a basic circuit and a plurality of electronic parts have been mounted, sets an execution environment of the UE 100, maintains information thereof, allows the UE 100 to be stably operated, and enables data input/output exchange between devices of the UE 100. The PCB 1700 may include a first pad 1711 and a second pad 1713 connected to a ground 1703. The PCB 1700 may form a first pattern 1712 of a line shape for electrically connecting power with the first pad 1711, and a second pattern 1714 of a line shape for electrically connecting the ground 1703 with the second pad 1713. The PCB 1700 may include a pull-up resistance device 1715 mounted on the first pattern 1712. The PCB 1700 may include a pull-down resistance device mounted on the second pattern 1714. Conductive clips 1810 may be mounted on the first pad 1711 and the second pad 1713 of the PCB 1700, respectively. The conductive clip 1810 may include a mount portion 1811 electrically attached, for example, surface-mounted on the first pad 1711 and the second pad 1713, and a clip portion 1812 extending upward from the mount portion 1811. The clip portion 1812 of the conductive clip 1810 may be a shape whose end is divided into two parts. The ends of the moisture detection sheet 140 may be fit between the two parts of the clip portion 1812. In the case where the conductive fluid (such as water) permeates the moisture detection sheet 140, the moisture detection sheet 140 may conduct electricity, and the first pad 1711 and the second pad 1713 of the PCB 1700 may be electrically connected.

Figure 19:
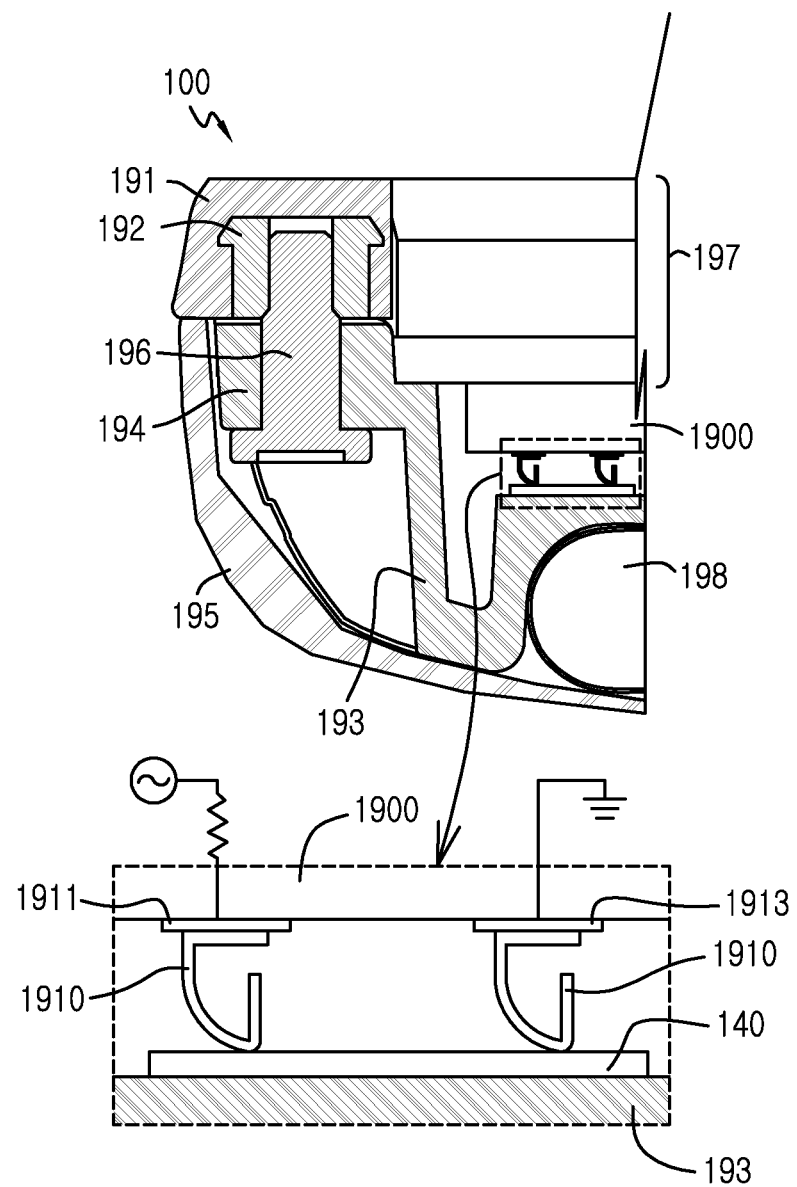
FIG. 19, FIG. 20 and FIG. 21 are cross-sectional views of UE according to invention principles.
Figure 20:
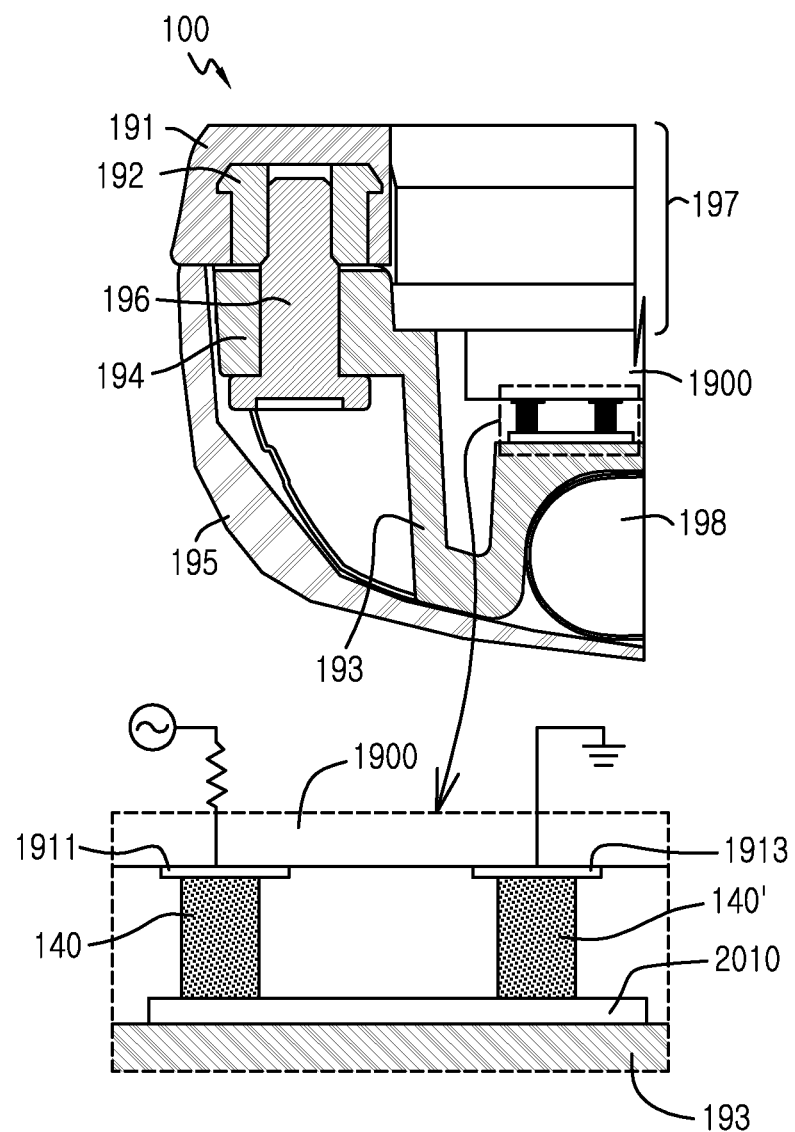

FIGS. 19 and 20 are cross-sectional views of UE 100 having a housing and the above-described elements are incorporated in a receiving space of the housing. The housing may include a front housing 191, a rear housing 193, and a battery cover 195. The front housing 191 and the rear housing 193 are coupled to each other, and the battery cover 195 is detachable from the rear housing 193. The front housing 191 may be located in front of the UE 100, and the rear housing 193 and the battery cover 195 may be located towards the back of the UE 100. The front housing 191 may form a boss 192 for screw-coupling with the rear housing 193. The boss 192 may have a screw fasten portion having a screw hole to be coupled with a screw. The screw fasten portion is metal and may be formed inside the boss 192 during injection molding. The rear housing 193 may form a boss fasten hole 194 to be screw-coupled with the boss 192 of the front housing 191. A screw 196 may pass through the boss fasten hole 194 of the rear housing 193, and may be fastened to the boss 192 of the front housing 191, so that the front housing 191 and the rear housing 193 may be coupled to each other.

The front housing 191 and the rear housing 193 are coupled to each other to form a space open to the front of the UE 100. The touchscreen 197 and the PCB 1900 may be located in this space. The touchscreen 197 may be located on the PCB 1900 and include a window, a touch panel, and a display. The battery cover 195 has snap-fits for coupling at its edge, and the snap-fits may fit in coupling recesses prepared in the rear housing 193 when the battery cover 195 is coupled to the rear housing 193. The rear housing 193 prepares a recess for receiving a battery 198 and the battery cover covers the rear housing 193, so that the battery 198 may be hidden.

The PCB 1900 may include a first pad 1911 electrically connected with power, and a second pad 1913 electrically connected with a ground. Elastic members 1910 may be electrically attached to the first pad 1911 and the second pad 1913 of the PCB 1900, respectively. One end of the elastic member 1910 may be mounted on the first pad 1911 and the second pad 1913 of the PCB 1900, and a free end extending from the one end may be elastically supported by the one end. The moisture detection sheet 140 may be attached on the inner surface of the rear housing 193, and when the front housing 191 and the rear housing 193 are coupled to each other, the free ends of the two elastic members 1910 mounted on the PCB 1900 may contact the moisture detection sheet 140 while elastically pressurizing both ends of the moisture detection sheet 140 attached on the rear housing 193. In the case where conductive fluid permeates the moisture detection sheet 140, the moisture detection sheet 140 may conduct electricity, and the first pad 1911 and the second pad 1913 may be electrically connected with each other.

Referring to FIG. 20, the PCB 1900 may include a first pad 1911 electrically connected with power and a second pad 1913 electrically connected with a ground. A conductive sheet 2010 may be attached on the inner surface of the rear housing 193. A conductive material may be a coating rather than the conductive sheet 2010. Both ends of the one moisture detection sheet 140 may be connected to the first pad 1911 of the PCB 1900 and the conductive sheet 2010, respectively. Both ends of the other moisture detection sheet 140' may be connected to the second pad 1913 of the PCB 1900 and the conductive sheet 2010, respectively. In the case where conductive fluid permeates the moisture detection sheets 140 and 140', the moisture detection sheets 140 and 140' may conduct electricity, and the first pad 1911 and the second pad 1913 of the PCB 1900 may be electrically connected via the moisture detection sheet 140 and the conductive sheet 2010.

Figure 21:
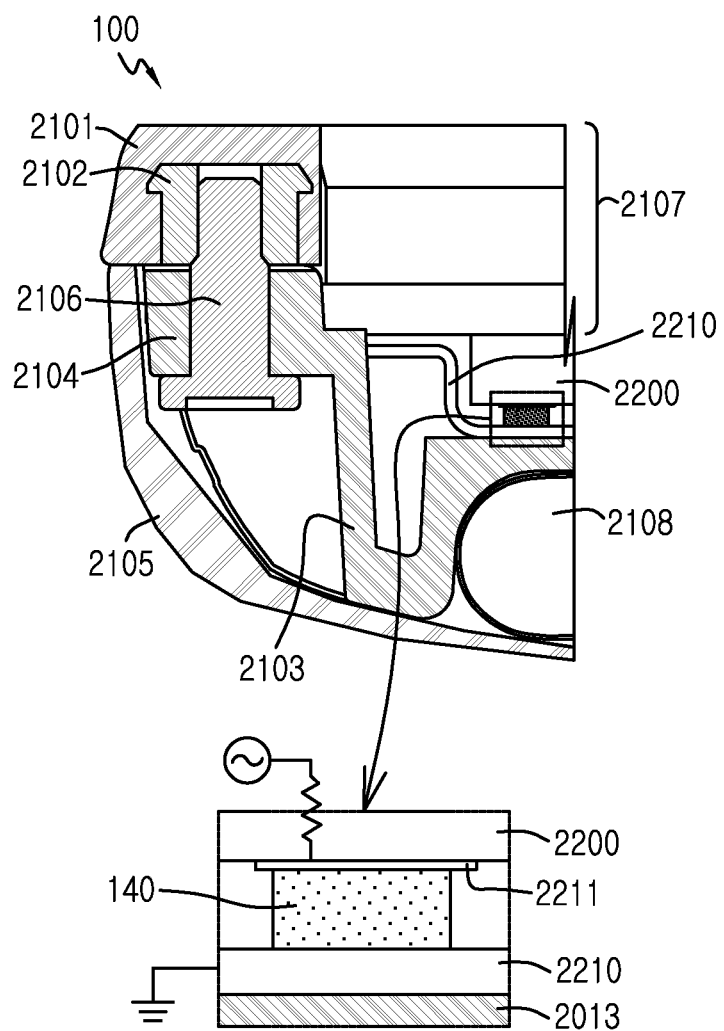

FIG. 21 shows a cross-sectional view of UE 100 having a housing including the above-described elements in a receiving space of the housing. The housing may include a front housing 2101, a rear housing 2103, and a battery cover 2105. The front housing 2101 and the rear housing 2103 are coupled to each other, and the battery cover 2105 is detachable from the rear housing 2103. The front housing 2101 may be located in front of the UE 100, and the rear housing 2103 and the battery cover 2105 may be located in the backside of the UE 100. The front housing 2101 may form a boss 2102 for screw-coupling with the rear housing 2103. The boss 2102 may have a screw fasten portion having a screw hole to be coupled with a screw. The screw fasten portion is metal and may be formed inside the boss 2102 during injection molding. The rear housing 2103 may form a boss fasten hole 2104 to be screw-coupled with the boss 2102 of the front housing 2101. A screw 2106 may pass through the boss fasten hole 2104 of the rear housing 2103, and may be fastened to the boss 2102 of the front housing 2101, so that the front housing 2101 and the rear housing 2103 may be coupled to each other.

The front housing 2101 and the rear housing 2103 are coupled to each other to form a space open to the front of the UE 100. The touchscreen 2107 and the PCB 2200 may be located in this space. The touchscreen 2107 may be located on the PCB 2200 and include a window, a touch panel, and a display. A metal plate 2210 may be installed between the rear housing 2103 and the PCB 2200. The metal plate 2210 may be fixed to the rear housing 2103 or the PCB 2200. The metal plate 2210 overlaps the PCB 2200 and may shield noise generated by the PCB 2200 and elsewhere. The battery cover 2105 has snap-fits for coupling at its edge, and the snap-fits may fit in coupling recesses prepared in the rear housing 2103 when the battery cover 2105 is coupled to the rear housing 2103. The rear housing 2103 prepares a recess for receiving a battery 2018 and when the battery cover 2105 is coupled, the battery cover covers the rear housing 2103, so that the battery 2108 may be hidden.

In the case where the metal plate 2210 is coupled to the rear housing 2103 and the PCB 2200, the metal plate 2210 may be electrically connected to the ground of the PCB 2200. For example, a portion protruding from one side of the metal plate 2210 may electrically contact the ground of the PCB 2200. A conductive elastic member mounted on the PCB 2200 may electrically contact the metal plate 2210 while elastically pressurizing the metal plate 2210. The PCB 2200 may have a pad 2211 electrically connected with power. One end of the moisture detection sheet 140 may be connected to the pad 2211 of the PCB 2200, and the other end of the moisture detection sheet 140 may be connected to the metal plate 2210. In the case where conductive fluid permeates the moisture detection sheet 140, the moisture detection sheet 140 may conduct electricity, and the first pad 1911 of the PCB 2200 and the metal plate 2210 may be electrically connected.

Although the invention has been shown and described with reference to certain exemplary embodiments thereof, it will be understood by those skilled in the art that different changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

Also, methods according to embodiments described in claims and/or the specification of the present invention may be implemented in the form of a hardware, a software, or a combination of a hardware and a software.

The above-described embodiments can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. The functions and process steps herein may be performed automatically or wholly or partially in response to user command. An activity (including a step) performed automatically is performed in response to executable instruction or device operation without user direct initiation of the activity. No claim element herein is to be construed under the provisions of 35 U.S.C. 112, sixth paragraph, unless the element is expressly recited using the phrase "means for."

What is claimed is:

1. An electronic device comprising:
a power management integrated circuit (PMIC);
a load switch;
a processor;
a moisture detection sheet configured to detect whether the electronic device is contacted with conductive fluid, wherein one end of the moisture detection sheet is connected to a power source and another end of the moisture detection sheet is grounded, and
wherein electrical current is allowed from the one end of the moisture detection sheet to the another end of the moisture detection sheet, if the moisture detection sheet is contacted with the conductive fluid; and
a comparator configured to:
receive a voltage applied to the moisture detection sheet, wherein the voltage applied to the moisture detection sheet corresponds to a voltage between the one end of the moisture detection sheet and the another end of the moisture detection sheet, and
in response to determining that the voltage applied to the moisture detection sheet is lower than a reference voltage, transmit a signal for powering off at least one component of the electronic device, to one or more of the processor, the PMIC, or the load switch.

2. The electronic device of claim 1, wherein the PMIC is configured to:
receive power from battery;
regulate the received power to at least one power for providing to the at least one component of the electronic device;
provide the regulated at least one power to the at least one component of the electronic device; and
in response to receiving, from the comparator, the signal for powering off the at least one component of the electronic device, shut off the regulated at least one power to the at least one component of the electronic device.

3. The electronic device of claim 1, wherein the load switch is configured to:
receive power from battery;
provide the received power to the at least one component of the electronic device,
wherein the PMIC is configured to:
in response to receiving, from the comparator, the signal for powering off the at least one component of the electronic device, transmit, to the load switch, another signal for powering off the at least one component of the electronic device, and
wherein the load switch is further configured to:
in response to receiving, from the PMIC, the another signal for powering off the at least one component of the electronic device, shut off the received power to the at least one component of the electronic device.

4. The electronic device of claim 3, further comprising a memory,
wherein the processor is configured to:
in response to receiving, from the comparator, the signal for powering off the at least one component of the electronic device, store moisture information in the memory, and
wherein the moisture information comprises information regarding a time in which the electronic device is contacted with the conductive fluid and information regarding a location at which the electronic device is contacted with the conductive fluid.

5. The electronic device of claim 4, further comprising a camera unit and a global positioning system (GPS) receiver,
wherein the processor is further configured to:
in response to receiving, from the comparator, the signal for powering off the at least one component of the electronic device, acquire, the information regarding the location of the electronic device through the GPS receiver, and an image regarding the location of the electronic device using the camera unit, and
store, in the memory, the information regarding the location and the image regarding the location as the moisture information.

6. The electronic device of claim 4, wherein the processor is further configured to:
in response to receiving, from the comparator, the signal for powering off the at least one component of the electronic device, power off the electronic device, and
in response to receiving, from the PMIC, a signal for powering on the electronic device, display the moisture information within a display of the electronic device powered on.

7. The electronic device of claim 1, further comprising a printed circuit board (PCB),
wherein the end of the moisture detection sheet is fixed at a first conductive pad formed on the PCB, and
wherein the another end of the moisture detection sheet is fixed at a second conductive pad formed on the PCB.

8. The electronic device of claim 7, wherein the second conductive pad is electrically connected to a ground.

9. The electronic device of claim 7, wherein a pull-down resistor is mounted on a pattern on the PCB electrically connected with the second conductive pad, and
wherein a pull-up resistor is mounted on a pattern on the PCB electrically connected with the first conductive pad.

10. The electronic device of claim 7, further comprising:
a first conductive member electrically attached to the first conductive pad; and
a second conductive member electrically attached to the second conductive pad,
wherein the end of the moisture detection sheet contacts the first conductive member, and
wherein the another end of the moisture detection sheet contacts the second conductive member.

11. The electronic device of claim 10, wherein the first conductive member comprises:
a first mount portion electrically attached to the first conductive pad; and
a first clip portion extending upward from the first mount portion and holding the end of the moisture detection sheet, and
wherein the second conductive member comprises:
a second mount portion electrically attached to the second conductive pad; and
a second clip portion extending upward from the second mount portion and holding the another end of the moisture detection sheet.

12. The electronic device of claim 10, wherein the first conductive member comprises:
a first mount portion electrically attached to the first conductive pad; and
a first clip portion extending upward from the first mount portion and elastically pressurizing the end of the moisture detection sheet, and
wherein the second conductive member comprises:
a second mount portion electrically attached to the second conductive pad; and
a second clip portion extending upward from the second mount portion and elastically pressurizing the another end of the moisture detection sheet.

13. The electronic device of claim 12, wherein the moisture detection sheet is attached on an inner surface of a housing of the electronic device.

14. The electronic device of claim 1, further comprising:
another moisture detection sheet; and
a conductive sheet attached on an inner surface of a housing of the electronic device,
wherein a first end of the moisture detection sheet is attached to a first pad,
wherein a second end of the moisture detection sheet is attached to the conductive sheet,
wherein a third end of the another moisture detection sheet is attached to a second pad, and
wherein a fourth end of the another moisture detection sheet is attached to the conductive sheet.

15. The electronic device of claim 1, further comprising:
a printed circuit board (PCB); and
a metal plate located to overlap the PCB and electrically connected with a ground of the PCB,
wherein the another end of the moisture detection sheet is attached to the metal plate, and
wherein the end of the moisture detection sheet is attached to at least one conductive pad formed on the PCB.

16. A method of an electronic device comprising a moisture detection sheet configured to detect whether the electronic device is contacted with conductive fluid,
wherein one end of the moisture detection sheet is connected to a power source and another end of the moisture detection sheet is grounded, and
wherein electrical current is allowed from the one end of the moisture detection sheet to the another end of the moisture detection sheet, if the moisture detection sheet is contacted with the conductive fluid,
the method comprising:
receiving, by a comparator of the electronic device, a voltage applied to the moisture detection sheet, wherein the voltage applied to the moisture detection sheet corresponds to a voltage between the one end of the moisture detection sheet and the another end of the moisture detection sheet, and
in response to determining, by the comparator, that the voltage applied to the moisture detection sheet is lower than a reference voltage, transmitting, by the comparator, a signal for powering off at least one component of the electronic device, to one or more of a processor of the electronic device, a power management integrated circuit (PMIC) of the electronic device, or a load switch of the electronic device.

17. The method of claim 16, further comprising:
in response to receiving, by the processor, from the comparator, the signal for powering off the at least one component of the electronic device, storing, by the processor, moisture information,
wherein the moisture information comprises information regarding a time in which the electronic device is contacted with the conductive fluid and information regarding a location at which the electronic device is contacted with the conductive fluid.

18. The method of claim 17, further comprising:
in response to receiving, by the processor, from the comparator, the signal for powering off the at least one component of the electronic device, powering off, by the processor, the electronic device, in response to receiving, by the processor, from the PMIC, a signal for powering on the electronic device, displaying, by the processor, the moisture information within a display of the electronic device powered on.

\* \* \* \* \*